J. I. CHAMBERS.
TRACTION BINDER.
APPLICATION FILED AUG. 27, 1914.
1,201,438.
Patented Oct. 17, 1916.
2 SHEETS—SHEET 1.
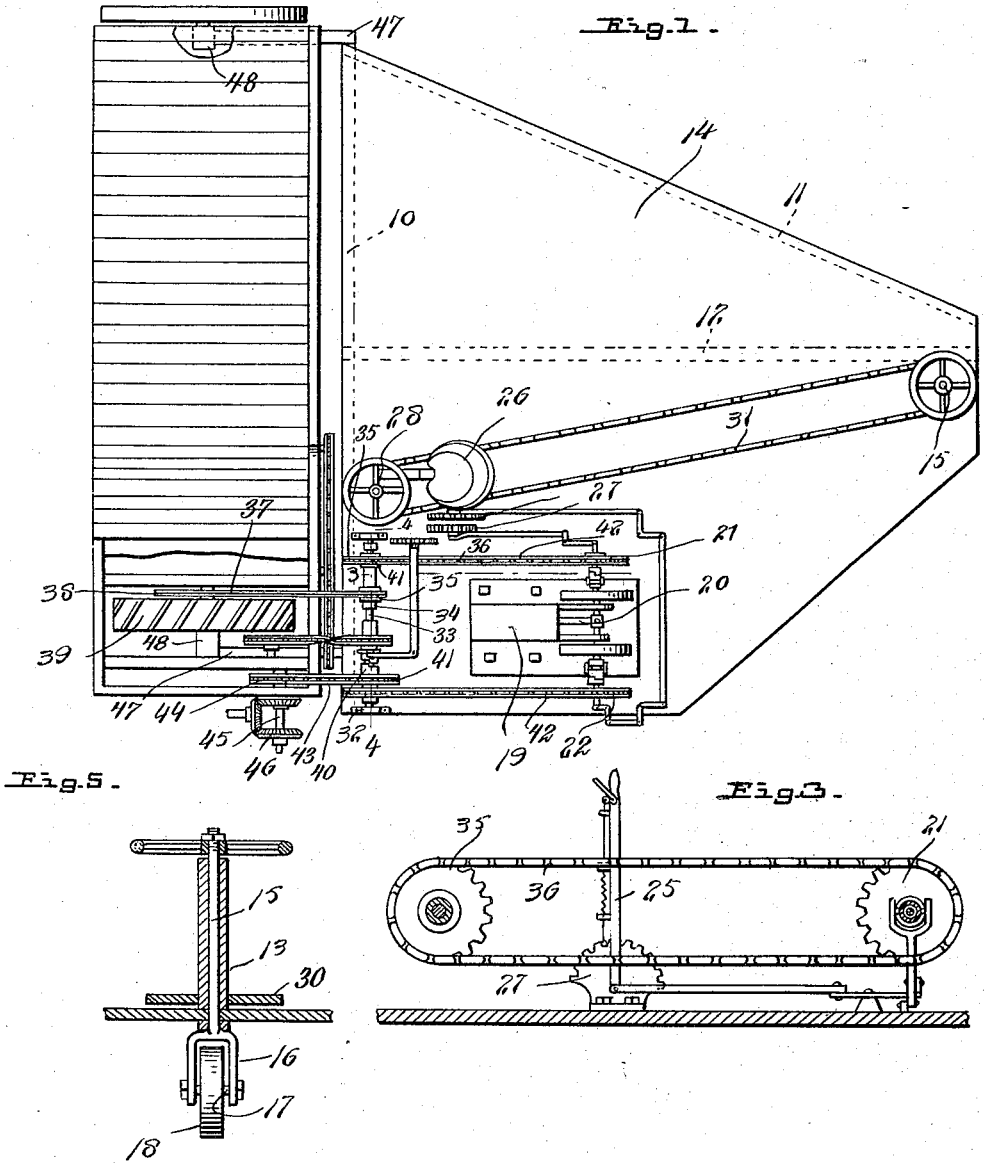
Witnesses
Inventor
J. I. Chambers J. I. CHAMBERS.
TRACTION BINDER.
APPLICATION FILED AUG. 27, 1914.
1,201,438.
Patented Oct. 17, 1916.
2 SHEETS—SHEET 2.
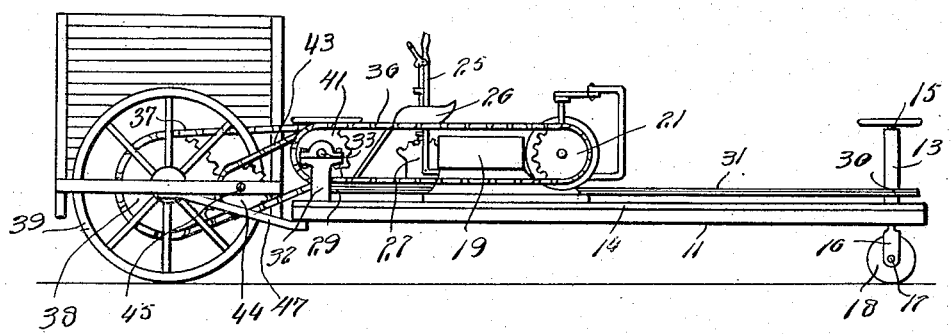
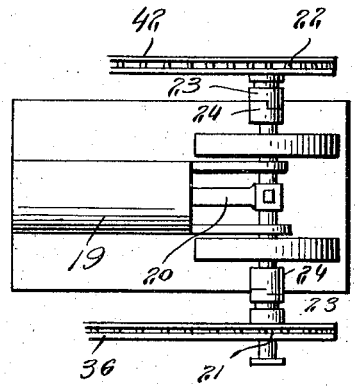
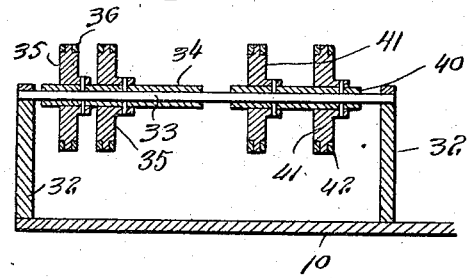
Witnesses
Inventor
J. I. Chambers.
By
Attorneys

UNITED STATES PATENT OFFICE.

JAMES I. CHAMBERS, OF KNOXVILLE, IOWA.

TRACTION-BINDER.

1,201,438.　　　　　Specification of Letters Patent.　　Patented Oct. 17, 1916.

Application filed August 27, 1914. Serial No. 858,946.

*To all whom it may concern:*

Be it known that I, JAMES I. CHAMBERS, a citizen of the United States, residing at Knoxville, in the county of Marion, State of Iowa, have invented certain new and useful Improvements in Traction-Binders; and I do hereby declare the following to be a full, clear, and exact description of the invention, such as will enable others skilled in the art to which it appertains to make and use the same.

This invention relates to attachments for agricultural implements such as harvesters, headers, reapers, binders and other like implements.

The principal object of the invention is to provide a novel form of propelling and driving attachment adapted to be secured to any one of the above type of implements.

A second object of the invention is to provide an improved device of this character wherein the machine may either be driven through the field without the cutting or binding operation taking place or may be simultaneously driven forward and the cutting or binding mechanisms actuated.

A third object of the invention is the provision of means of improved character whereby, when the device is not in operation as an agricultural implement, the entire power of the motor may be thrown on the ground wheels so that the device may readily and quickly be moved from one place to another when idle, it being of course understood that when the cutting operations are taking place it is not desirable to run the machine as fast as when the cutting operations are not taking place.

With the above and other objects in view the invention consists in general of certain novel details of construction and combination of parts hereinafter fully described, illustrated in the accompanying drawings, and specifically claimed.

In the accompanying drawings, like characters of reference indicate like parts in the several views, and Figure 1 is a plan view of a portion of a harvester showing the device applied thereto. Fig. 2 is a side elevation of the device as applied to the harvester. Fig. 3 is a detail section on the line 3—3 of Fig. 1. Fig. 4 is a detail section on the line 4—4 of Fig. 1. Fig. 5 is a section through the steering gear. Fig. 6 is an enlarged view showing the clutch arrangement on the engine shaft, the engine being only indicated in out-line.

In carrying out the objects of this invention there is provided a frame which includes the front frame bar 10, side frame bars 11 and intermediate frame bar 12. These side frame bars converge toward each other at the rear end and are suitably connected to a casting 13 in the form of a sleeve. The intermediate frame bar 12 connects the front frame bar and one of the side frame bars, being parallel to the other side frame bar so that a platform 14 may be located on this intermediate frame bar and its parallel side frame bar. Extending upward through the sleeve 13 is a spindle 15 having on its lower end a fork 16 wherein is journaled a shaft 17 carrying the rear or steering wheel 18.

Removably secured above the platform 14, by bolts or other suitable means, is an engine 19 of the gasolene or gas type. This engine 19 is provided with the usual shaft 20, and on this shaft 20, at each end thereof, are the sprocket wheels 21 and 22. These sprocket wheels are loosely mounted on the shaft so that they freely revolve thereon and each of these sprocket wheels is provided with a clutch member 23 which is adapted for engagement by a clutch member 24 splined on the shaft and controlled by a shipper lever 25 the handle of which is located adjacent the driver's seat 26. These shipper levers 25 are preferably in the form of latch levers and work over the quadrants 27 so that either clutch may be thrown into or out of engagement and held there by the latch and sprocket.

Adjacent the driver's seat is a steering post 28 provided with usual steering wheel and it is to be understood that the engine is provided with the usual controlling levers common in all devices of this sort and not deemed necessary here to be specifically described. Fixed upon this steering post 26 is a sprocket 29 and on the spindle 15 is fixed a sprocket 30 which is connected to the sprocket 29 by means of a chain 31 so that as the steering post is rotated the spindle will also be rotated.

Mounted in suitable bearings 32 fixed to the front frame bar 10 is a shaft 33. On this shaft 33 is a sleeve 34 which is provided with a pair of sprockets 35. One of these sprockets 35 is connected by means of a chain 36 with the sprocket 21 while the remaining sprocket is connected by means of a chain 37 with a sprocket 38 fixed to the bull wheel 39 of the implement. On the stub shaft 33 is also revolubly mounted a sleeve 40 which is provided with a pair of sprockets 41. One of these sprockets 41 is connected by a chain 42 to the sprocket 22 of the engine shaft. The remaining sprocket 41 is connected by a chain 43 to a sprocket 44 on a suitable shaft 45 of the implement driving mechanism indicated in general at 46.

Now it is to be observed that from the foregoing arrangement by the proper manipulation of the clutch levers either one or both of the cutter or driving mechanisms may be thrown into service. For instance when it is desired to move the implement along the road the clutch mechanism controlling the bull wheel only is thrown into clutched position. When it is desired to cut, however, both mechanisms are thrown into clutched position. To facilitate attaching of the device to the frame of an implement, arms 47 are attached to project forwardly from the bar 10 of the device, the said arms being secured at their free ends to suitable boxings 48 mounted upon the shafts supporting the traction wheels of the implement.

It will be obvious that the operator manipulates the engine in the usual way starting and stopping it as desired and that when he desires to go to the left or to the right he simply steers in the usual manner. When he throws in the clutch to the bull wheel this causes the latter to revolve and the entire device moves forward. When he arrives in the field he then throws in the cutter mechanism clutch and he is then ready for the cutting operation.

There has thus been provided a simple and efficient device of the kind described and of the character specified.

It will be obvious that many minor changes may be made in the form and construction of this invention without departing from the material principles thereof. It it not therefore desired to confine the invention to the exact form herein shown and described, but it is wished to include all such as come properly within the scope claimed.

Having thus described the invention, what is claimed as new, is:—

In an attachment of the class described, a frame adapted at its forward end for attachment to an agricultural implement, a steering wheel supporting the rear end of said frame, an engine provided with a shaft and mounted on said frame, a plurality of sprockets revolubly mounted on said shaft, clutch mechanisms for selectively connecting said sprockets with said shaft, a stub shaft, sleeves mounted for rotation on said stub shaft, a pair of sprockets on each sleeve, a chain connecting one sprocket of each pair with a sprocket on said engine shaft, a connection between the remaining sprockets with a mechanism on said implement and the bull wheel thereof respectively, and a clutch mechanism for each of said sleeves whereby the sprockets may be selectively connected with said engine shaft.

In testimony whereof, I affix my signature, in the presence of two witnesses.

JAMES I. CHAMBERS.

Witnesses:
 LYLE GHRIST,
 B. L. HART.

Copies of this patent may be obtained for five cents each, by addressing the "Commissioner of Patents, Washington, D. C."